US006991114B2

(12) United States Patent
Allen, II et al.

(10) Patent No.: US 6,991,114 B2
(45) Date of Patent: *Jan. 31, 2006

(54) APPARATUS FOR SEPARATING FLOATING AND NON-FLOATING PARTICULATE FROM A FLUID STREAM

(75) Inventors: Vaikko P. Allen, II, Portland, ME (US); Daniel P. Cobb, Portland, ME (US)

(73) Assignee: Vortechnics, Inc., Scarborough, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/664,376

(22) Filed: Sep. 17, 2003

(65) Prior Publication Data

US 2005/0056587 A1 Mar. 17, 2005

(51) Int. Cl.
*B01D 21/00* (2006.01)
*B01D 21/02* (2006.01)

(52) U.S. Cl. .................................... 210/519; 210/532.1
(58) Field of Classification Search ................ 210/513, 210/519, 532.1
See application file for complete search history.

(56) References Cited

U.S. PATENT DOCUMENTS

| 3,385,444 A | * | 5/1968 | Dufournet ................ 210/195.4 |
| 3,642,129 A | | 2/1972 | McDaniel et al. |
| 3,862,040 A | | 1/1975 | Preus et al. |
| 3,951,817 A | * | 4/1976 | Snyder ....................... 210/521 |

(Continued)

FOREIGN PATENT DOCUMENTS

| AU | 2002301132 | 2/2002 |
| DE | 3305344 | 9/1984 |
| EP | 79302155.1 | 4/1980 |
| FR | 2536672 | 6/1984 |

(Continued)

OTHER PUBLICATIONS

Decool, J., Un separateur lamellaire vertical pour l'epuration des eaux de ruissellement, L'Eau, L'Industrie, Les Nuisances, Oct 1983, pp. 55–57, No. 77, Societe P. Johanet.

Aquarius Services & Technologies company website www.aquarius–h2o.com, technical description of DLC separator, 4 pp, original publication date unknown.

James Hardie FRC Pipes company technical brochure, Q–Guard Stormwater Treatment Device –Series X; copr 2002; references 2 patent documents.

Marsalek, J., Laboratory Testing of Stormceptor I, paper, May, 1993, 35 pp, National Water Research Institute, Burlington, Ontario, Canada.

Marsalek, J., Long, R., Doede, D., Laboratory Testing of Stormceptor II, paper, Oct., 1994, 38 pp, National Water Research Institute, Burlington, Ontario, Canada.

*Primary Examiner*—Fred G. Prince
(74) *Attorney, Agent, or Firm*—Verrill Dana, LLP; Chris A. Caseiro

(57) ABSTRACT

A fluid separation system includes a tank with a storage chamber for retaining floating and non-floating particulates. The tank includes a baffle for retaining floating particulates within the storage chamber and for directing flow out of the storage chamber. The tank also includes a bypass with an inlet flow control zone and an outlet flow control zone. The flow control zones are separated by a weir sized and positioned to regulate the fluid flow through a baffle port into the storage chamber. The weir also provides control of the flow rate at which incoming fluid is diverted directly through the bypass to the tank outlet rather than into the storage chamber. The baffle and/or the weir may be curved, and the baffle may include a complex curve, to aid in the smoothing of the fluid flow within the storage chamber to improve particulate separation.

39 Claims, 11 Drawing Sheets

U.S. PATENT DOCUMENTS

| | | | |
|---|---|---|---|
| 4,127,488 A | 11/1978 | Bell et al. |
| RE30,793 E | 11/1981 | Dunkers |
| 4,319,998 A | 3/1982 | Anderson |
| 4,328,101 A | 5/1982 | Broden |
| 4,363,731 A | 12/1982 | Filippi |
| 4,400,274 A | 8/1983 | Protos |
| 4,422,931 A | 12/1983 | Wolde-Michael |
| 4,517,091 A | 5/1985 | Yamanaka et al. |
| 4,551,247 A | 11/1985 | Borchert et al. |
| 4,747,962 A | 5/1988 | Smisson |
| 4,983,295 A | 1/1991 | Lamb et al. |
| 4,985,148 A | 1/1991 | Monteith |
| 5,133,619 A | 7/1992 | Murfae et al. |
| 5,216,974 A | 6/1993 | Gordon, Sr. |
| 5,232,587 A | 8/1993 | Hegemier et al. |
| 5,298,176 A | 3/1994 | Schloss |
| 5,322,629 A | 6/1994 | Stewart |
| 5,372,714 A | 12/1994 | Logue, Jr. |
| 5,403,474 A | 4/1995 | Emery |
| 5,405,539 A | 4/1995 | Schneider |
| 5,413,706 A | 5/1995 | Graves |
| 5,433,845 A | 7/1995 | Greene et al. |
| 5,498,331 A | 3/1996 | Monteith |
| 5,505,860 A | 4/1996 | Sager |
| 5,520,825 A | 5/1996 | Rice |
| 5,531,888 A | 7/1996 | Geiger et al. |
| 5,543,038 A | 8/1996 | Johannessen |
| 5,575,909 A | 11/1996 | Foster |
| 5,725,760 A | 3/1998 | Monteith |
| 5,746,911 A | 5/1998 | Pank |
| 5,746,912 A | 5/1998 | Monteith |
| 5,753,115 A | 5/1998 | Monteith |
| 5,759,415 A | 6/1998 | Adams |
| 5,788,848 A | 8/1998 | Blanche et al. |
| 5,814,216 A | 9/1998 | Filion |
| 5,849,181 A | 12/1998 | Monteith |
| 5,858,252 A | 1/1999 | Darcy |
| 5,928,524 A | 7/1999 | Casola |
| 6,062,767 A | 5/2000 | Kizhnerman et al. |
| 6,068,765 A | 5/2000 | Monteith |
| 6,077,448 A | 6/2000 | Tran-Quoc-Nam et al. |
| 6,086,756 A | 7/2000 | Roy |
| 6,120,684 A | 9/2000 | Kistner et al. |
| 6,183,633 B1 | 2/2001 | Phillips |
| 6,190,545 B1 | 2/2001 | Williamson |
| 6,241,881 B1 | 6/2001 | Pezzaniti |
| 6,264,835 B1 | 7/2001 | Pank |
| 6,315,897 B1 | 11/2001 | Maxwell |
| 6,315,899 B1 | 11/2001 | Hernandez |
| 6,337,016 B1 | 1/2002 | Alper |
| 6,350,374 B1 | 2/2002 | Stever et al. |
| 6,371,690 B1 | 4/2002 | Monteith |
| 6,428,692 B2 | 8/2002 | Happel |
| 6,432,298 B1 | 8/2002 | Carvalko, Jr. |
| 6,478,954 B1 | 11/2002 | Turner, Jr. et al. |
| 6,511,595 B2 | 1/2003 | Crompton et al. |
| 6,524,473 B2 | 2/2003 | Williamson |
| 6,547,962 B2 | 4/2003 | Kistner et al. |
| 6,581,783 B2 | 6/2003 | Blanche et al. |
| 6,641,720 B1 | 11/2003 | Crompton et al. |
| 6,676,832 B2 * | 1/2004 | de Bruijn et al. ............ 210/163 |
| 6,705,049 B2 | 3/2004 | Esmond et al. |
| 6,730,222 B1 * | 5/2004 | Andoh et al. ................ 210/304 |
| 6,783,683 B2 | 8/2004 | Collings |
| 2003/0121846 A1 * | 7/2003 | Use et al. .................... 210/521 |
| 2004/0055950 A1 | 3/2004 | Bryant |
| 2005/0184007 A1 * | 8/2005 | Allard et al. ............. 210/512.2 |

FOREIGN PATENT DOCUMENTS

| | | |
|---|---|---|
| FR | 2694748 | 2/1994 |
| GB | 18285 | 11/1915 |
| GB | 2127319 | 4/1984 |
| JP | 55-114313 | 3/1980 |
| JP | 9-262409 | * 10/1997 |
| JP | P2000-5509 | * 6/1998 |
| WO | WO99/42409 | 8/1999 |
| WO | WO02/04754 | 1/2002 |
| WO | WO03/031730 | 4/2003 |
| WO | WO04/103520 | 12/2004 |

* cited by examiner

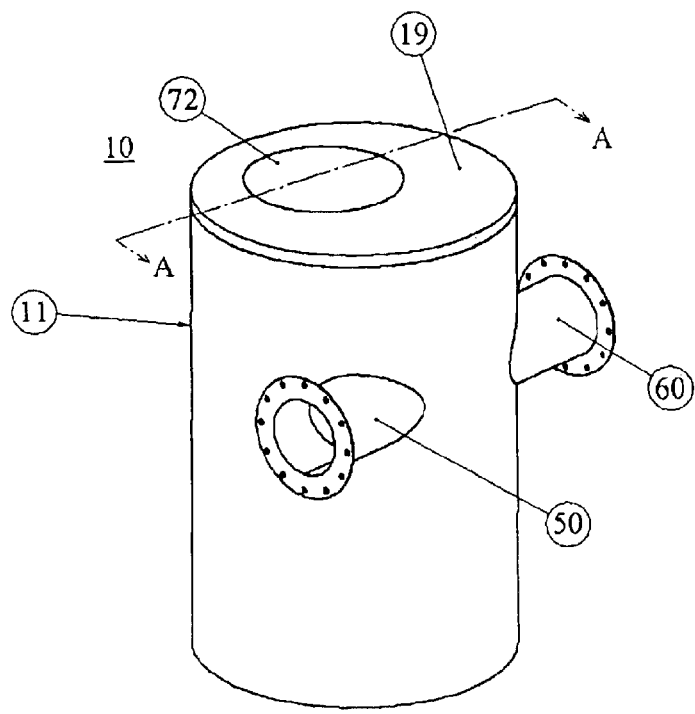
FIG. 1A
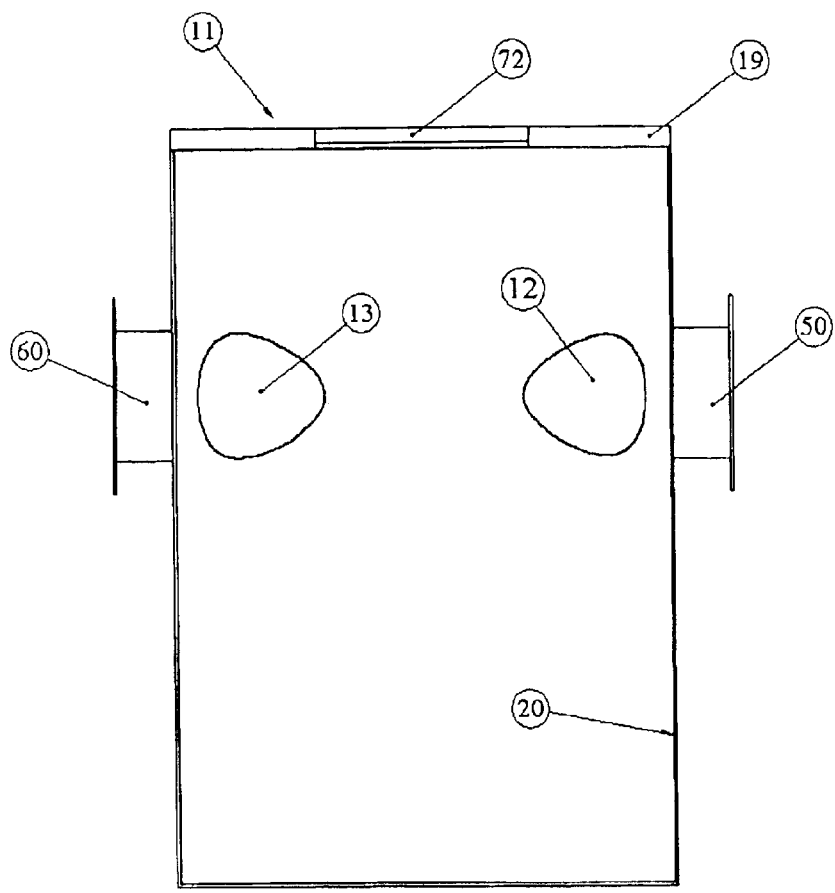
FIG. 1B (SECTION A-A)

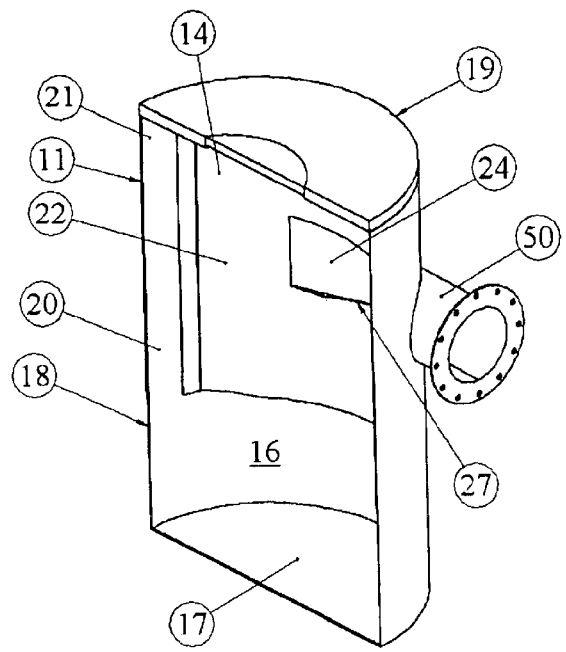
FIG. 2A (SECTION A-A)
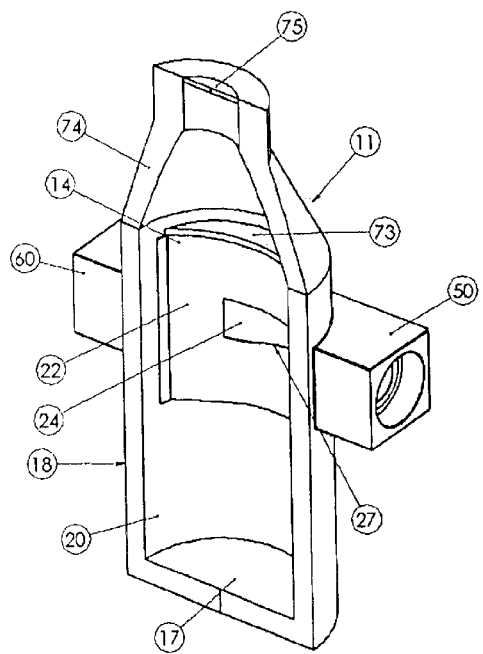
FIG. 2B
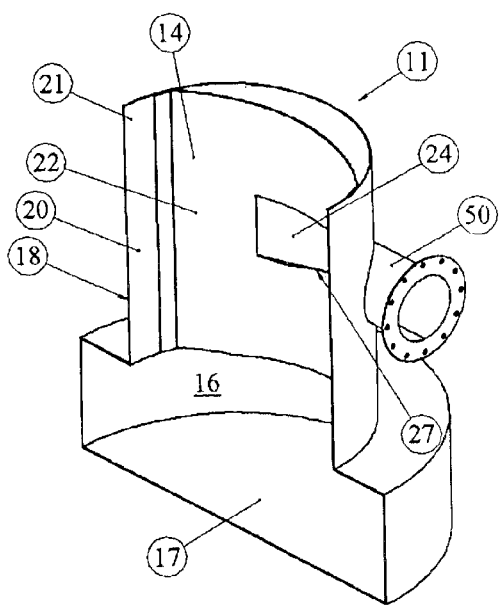
FIG. 2C

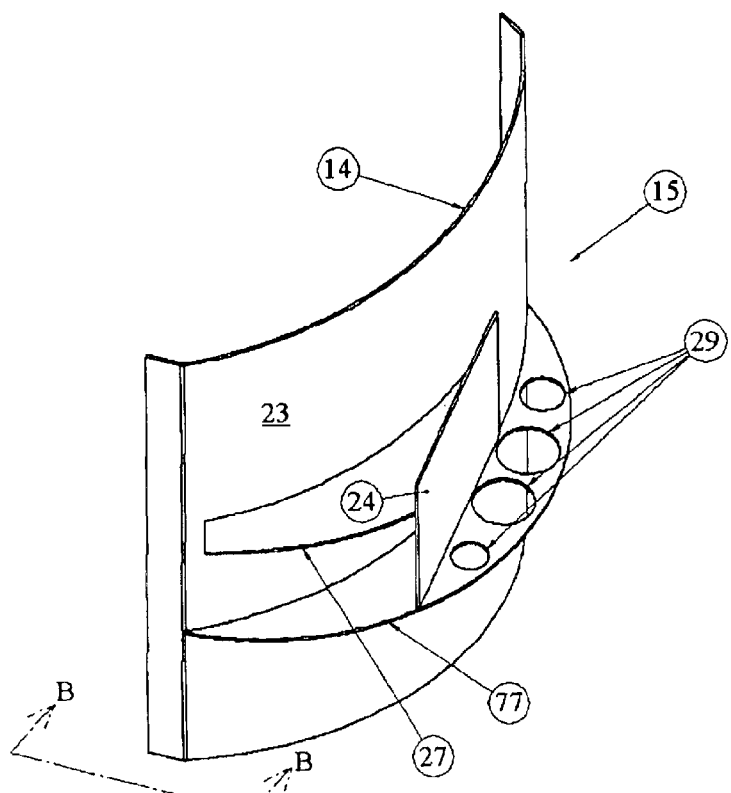
FIG. 4
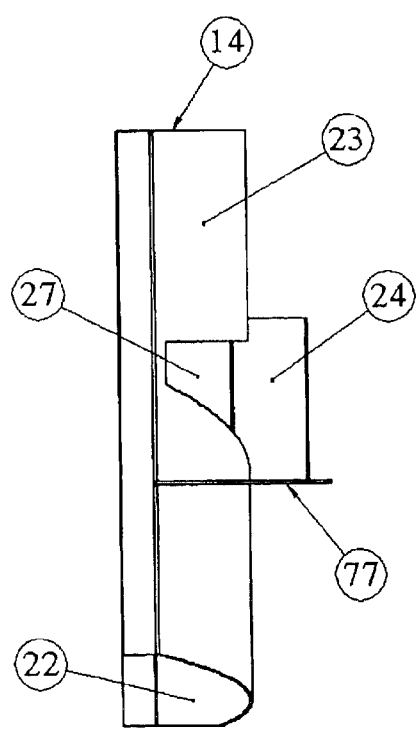
FIG. 5A (VIEW B-B)

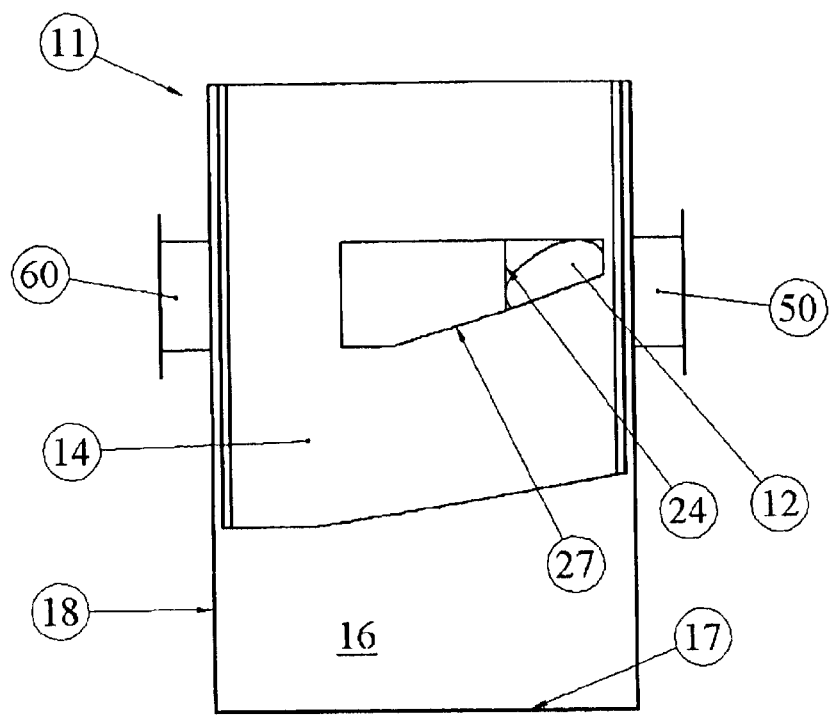
FIG. 5B (SECTION A-A)
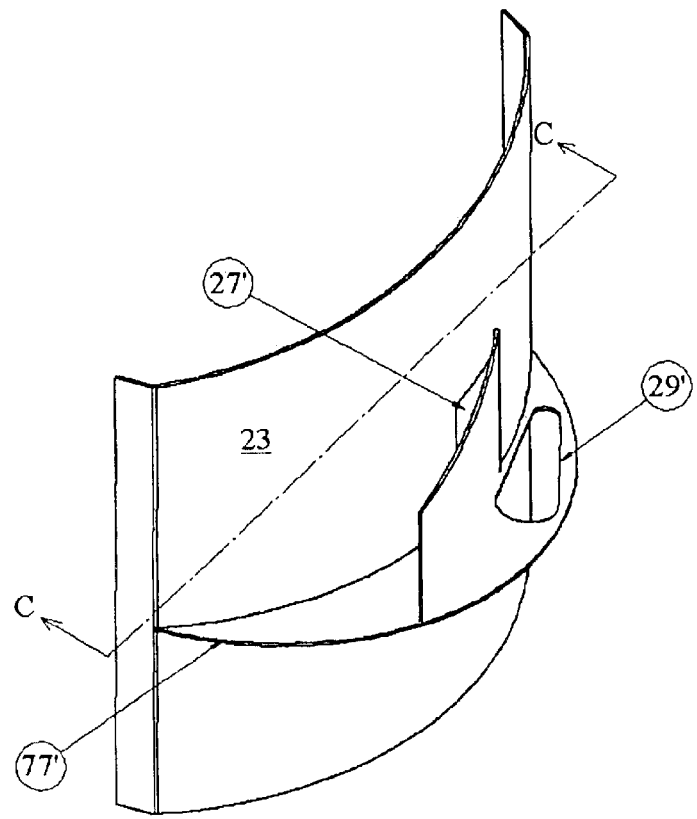
FIG. 6A

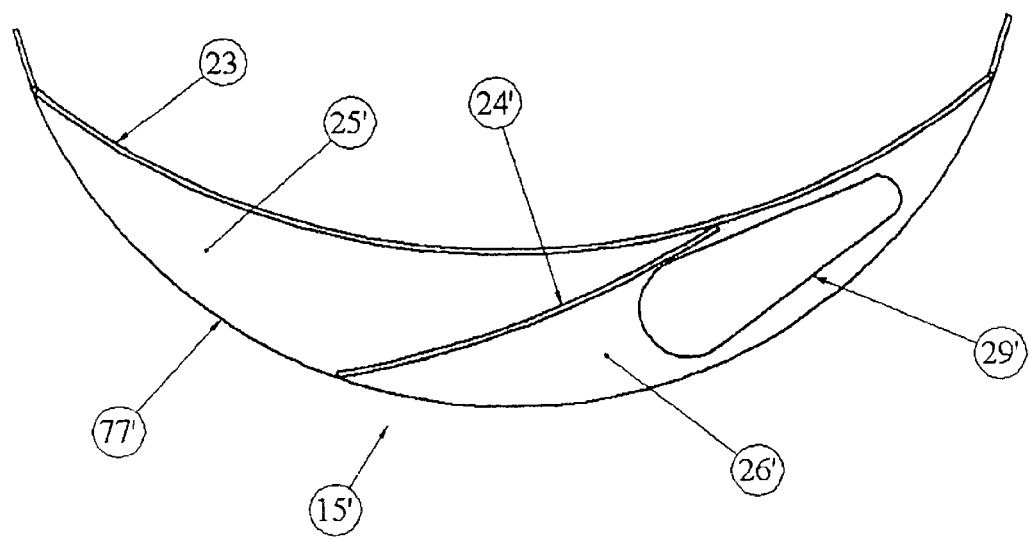
FIG. 6B
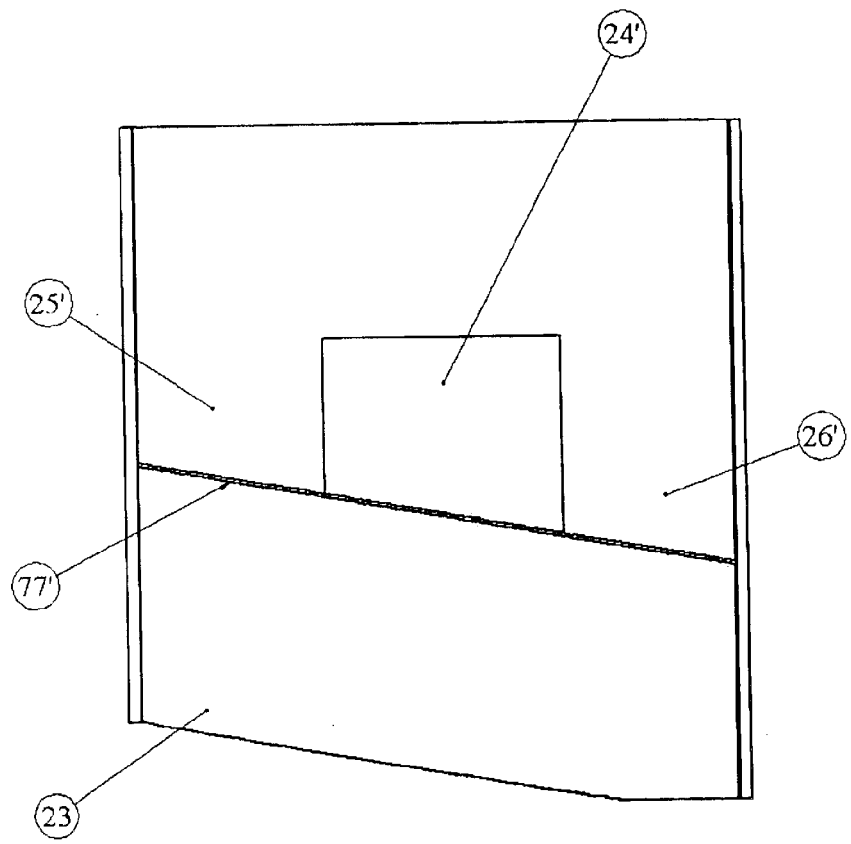
FIG. 6C (VIEW C-C)

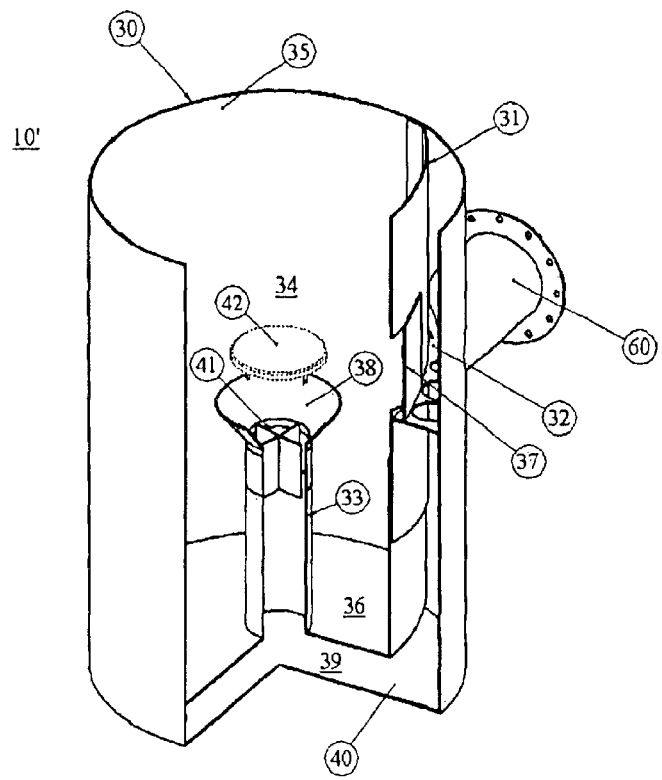
FIG. 7
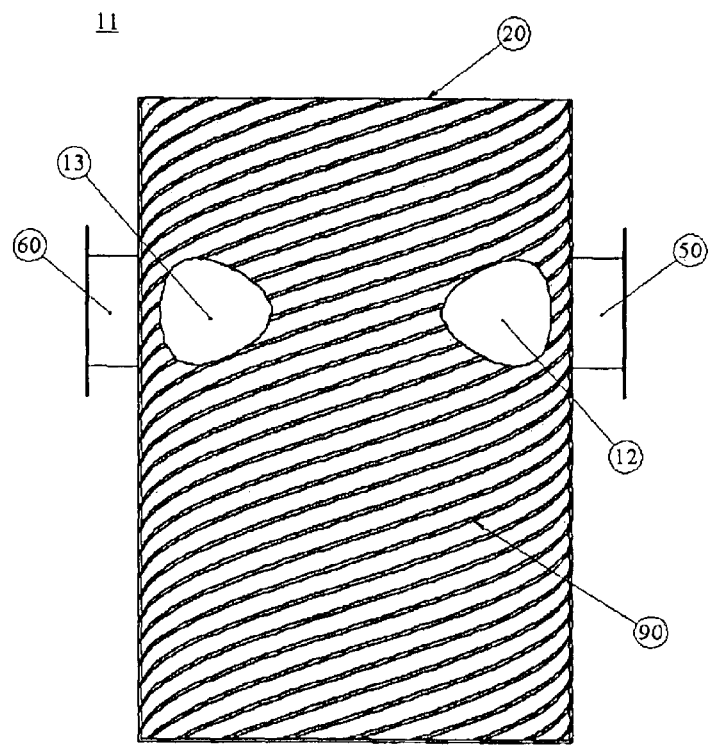
FIG. 8A (SECTION A-A)

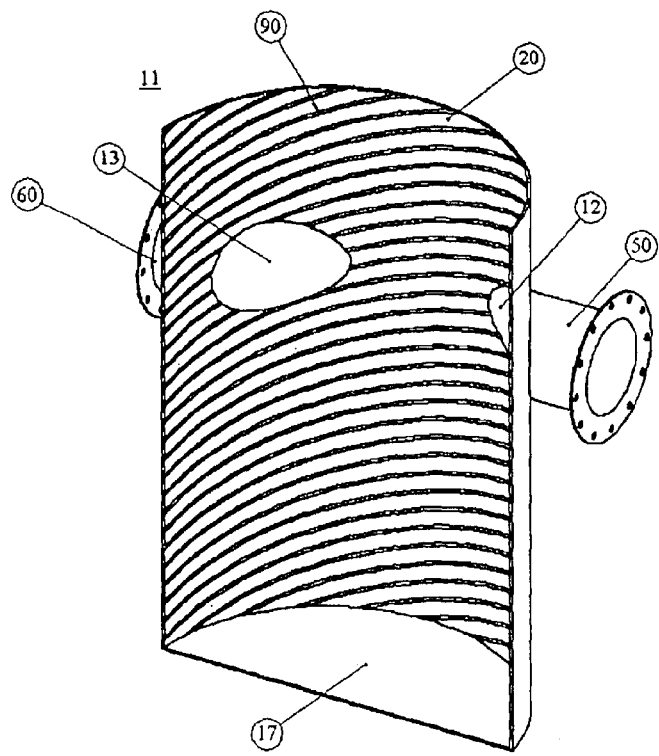
FIG. 8B (SECTION A-A)
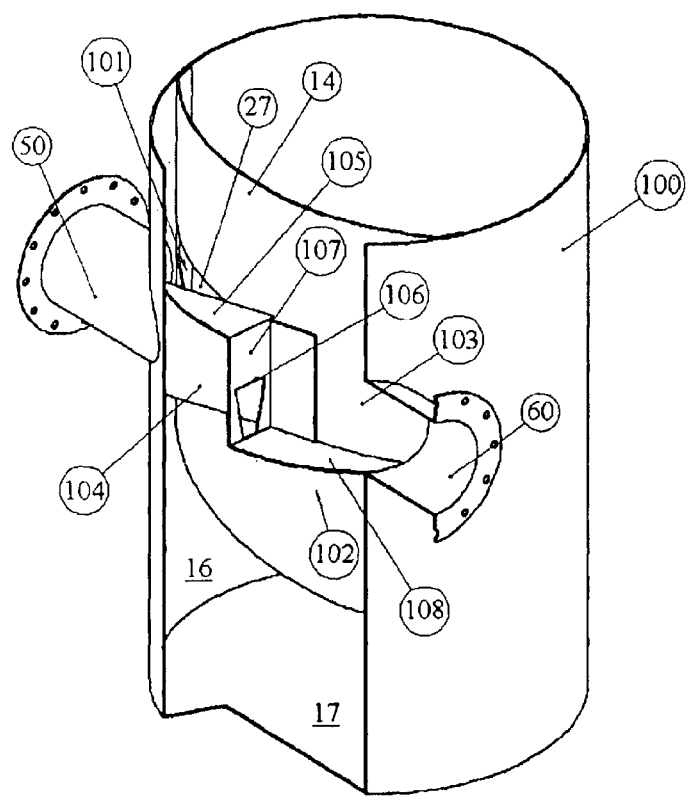
FIG. 9A

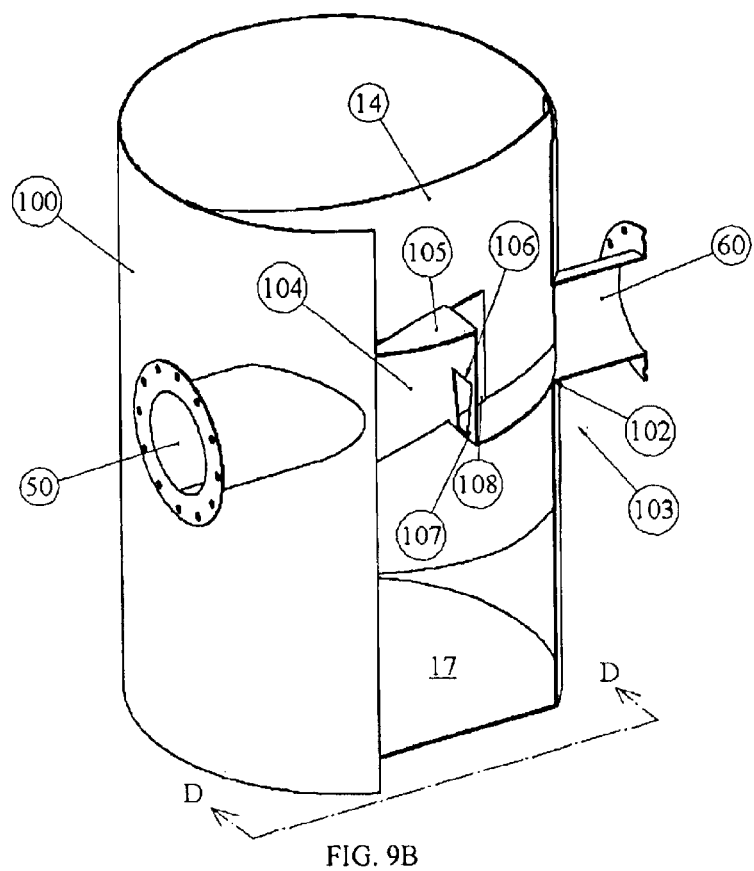
FIG. 9B
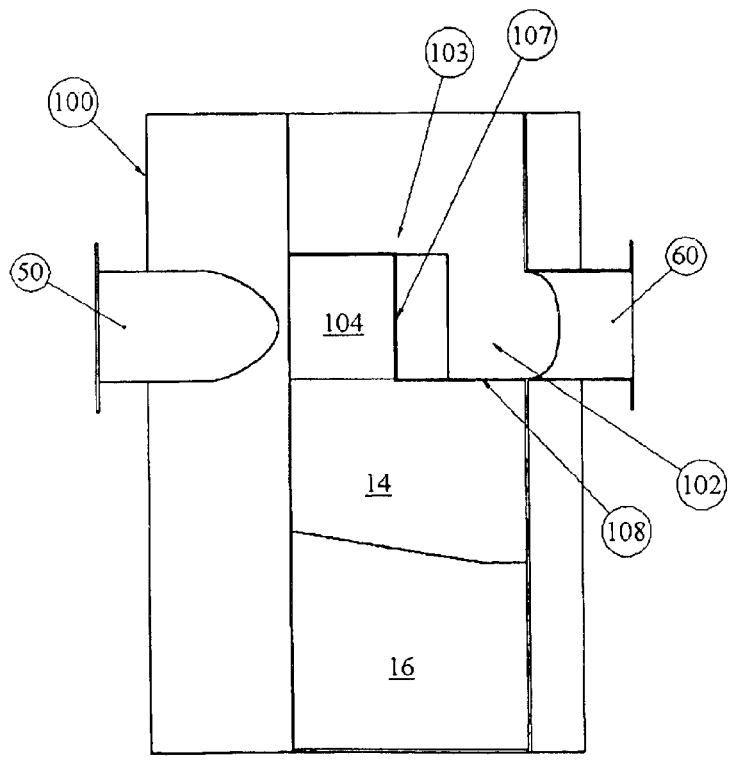
FIG. 9C (VIEW D-D)

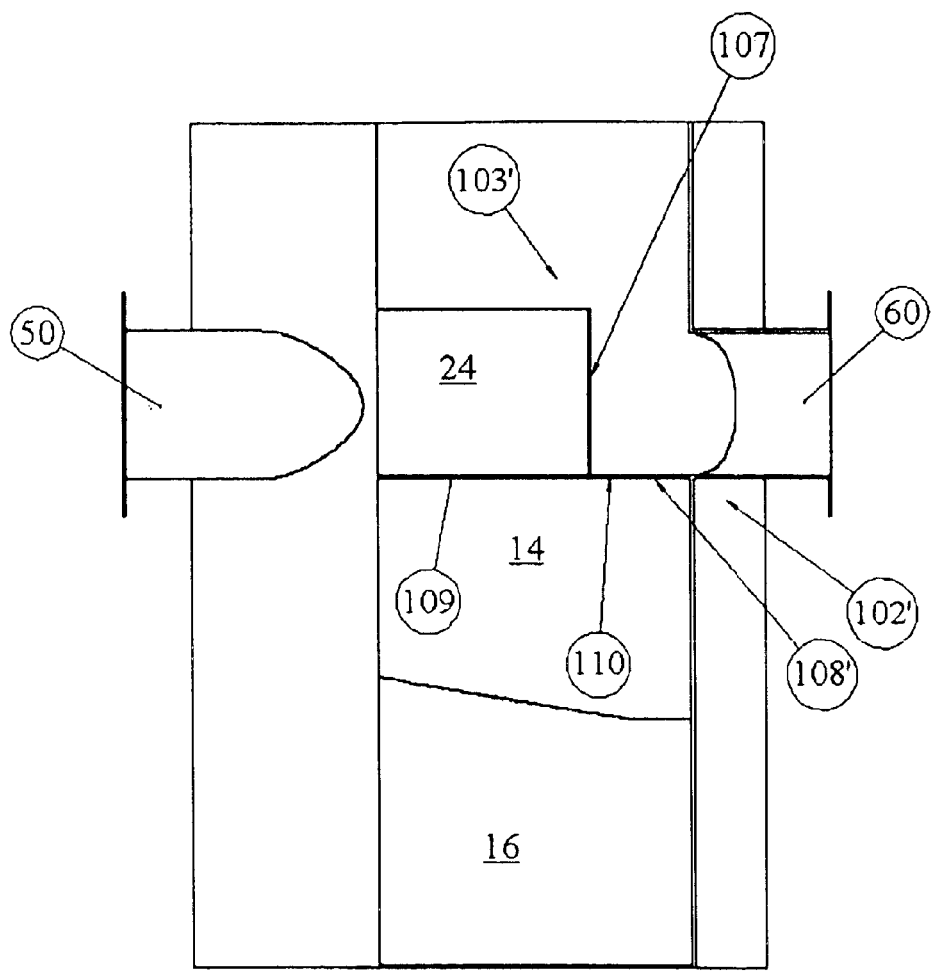
FIG. 10C (VIEW E-E)

APPARATUS FOR SEPARATING FLOATING AND NON-FLOATING PARTICULATE FROM A FLUID STREAM

BACKGROUND OF THE INVENTION

1. Field of the Invention

The present invention relates to systems for separating floating and non-floating particulate from fluids such as drain water and stormwater. More particularly, the present invention relates to a separation system that may be independent, or form part, of a larger fluid transfer system.

2. Description of the Prior Art

Fluid transfer systems have been and will remain an important aspect of municipal services and commercial facilities management. The protection of ground water and natural bodies of water requires systems for diverting and/or treating water that contacts roadways, parking lots, and other man made structures. If such diversion or treatment systems are not provided, particulate and contaminants located on or forming part of such structures may be carried by drain water or stormwater to the natural water bodies and contaminate them. Local, state and federal laws and rules require municipalities, businesses and, in some instances, private entities, to establish means to reduce particulate and contaminant levels permissibly transferred to natural bodies of water from property under their control. Particular requirements may vary from jurisdiction to jurisdiction, but all are likely to become more, rather than less, stringent.

Previously, municipal water transfer and treatment facilities provided the only mechanism for diverting contaminated water away from natural bodies of water, either for holding or treatment for subsequent transfer to natural settings. In general, that process involved, and continues to involve, the establishment of a system of drains, such as in a parking lot or at a street curb, by which water enters a system of pipe conduits. Eventually, the water received from the drains reaches either a final outlet destination or is directed to a treatment system for contaminant removal. For purposes of the description of the present invention, "contaminated water" is to be understood to mean any water including floating particulate, such as Styrofoam™ containers and oil, for example; non-floating particulate, such as sand and silt, for example; and entrained contaminants.

Land development produces increased levels of drain water and stormwater runoff, resulting in increased strain on existing water transfer and treatment infrastructure and an increased likelihood of natural water contamination. In an effort to reduce the impact of development on natural resources and municipal services, initial upstream fluid treatment has become a requirement in many land development, restoration and repair projects. That is, requirements in various forms have been established to ensure that before contaminated water enters the municipal water transfer and/or treatment system, it must be treated in a manner that reduces the level of contaminants entering the municipal system. Therefore, most new land development plans and upgrades to existing paved surfaces involve the insertion of a preliminary separation system, generally for connection to the municipal water-handling infrastructure.

Any preliminary separation system must be designed with the capability to receive fluid flowing in at a wide range of rates. For example, a mild rainfall resulting in rain accumulation of less than 0.25 inches over a span of 24 hours produces a relatively low flow rate through the system. On the other hand, for example, a torrential rainfall resulting in rain accumulation of more than two inches over a span of three hours produces relatively high flow rates through the system. It is desirable, then, to have a separation system capable of handling variable fluid flow rates with reduced likelihood of backup and flooding of the surface above. It is also desirable to control the flow through the system such that trapped particulates are not scoured or washed out of the device and re-entrained during high flows for passage downstream.

In addition to having a reasonable fluid flow throughput capacity, the separation system must be capable of performing the separation function for which it is intended. Specifically, it may be required to remove from the fluid flow path a certain number, type, or size of floating particulate. It may also be required to remove from that fluid flow path a certain number, type or size of non-floating particulate. It would be preferable to have such a separation system that can remove from the fluid flow path the particulates for which it is designed at the widest range of flow rates but without causing backup or scouring/washout. For that reason, some such systems are designed with a bypass mechanism to permit direct flow through of fluid without preliminary treatment when relatively high flow rates are reached. Unfortunately, ineffectively designed separation systems fail to provide the best particulate removal and further fail to do so under flow rates that may not be particularly high.

There is an increasing need and requirement for separation systems associated with drain water and stormwater introduction to municipal water handling systems. However, it is important that they not be prohibitively expensive in order to ensure that meeting those needs and requirements is feasible. It is also of importance that such separation systems are relatively easy to access for maintenance. It is also preferable that separation systems provide a reasonable arrangement for storing accumulated floating and non-floating particulates to minimize the possibility of clogged inlets and outlets and to extend the required maintenance cycle.

Therefore, what is needed is a separation system that may or may not be part of a larger fluid handling system that effectively accommodates varied fluid flow rates. What is also needed is such a separation system that conforms or substantially conforms with established floating and non-floating particulate removal requirements. Further, what is needed is such a separation system that is configured to minimize clogging possibilities and to maximize particulate removal capability in a cost effective arrangement. Yet further, what is needed is such a separation system that is configured for ease of maintenance and to maximize the ability to accumulate particulates.

SUMMARY OF THE INVENTION

It is an object of the present invention to provide a separation system that is effective in accommodating varied fluid flow rates. It is also an object of the present invention to provide such a separation system that conforms or substantially conforms with established floating and non-floating particulate removal requirements. Further, it is an object of the invention to provide such a separation system that is configured to minimize clogging possibilities and to maximize particulate removal capability in a cost effective arrangement. Yet further, it is an object of the present invention to provide such a separation system that is configured for ease of maintenance and to maximize the ability to accumulate particulates.

These and other objectives are achieved with the present invention. The invention is a fluid separation system having an inlet and an outlet. The inlet may be in direct contact with a fluid or it may be connectable to an upstream fluid transfer conduit. The outlet may be in direct contact with a surface water location or it may be connectable to a downstream fluid transfer conduit. If applicable, the upstream fluid transfer conduit and the downstream fluid transfer conduit may be part of a common municipal water handling system. For example, the upstream conduit may be associated with a drain arranged for water on a surface, such as a parking lot surface, to be removed from the surface, and the downstream conduit may form part of the water transfer mechanism designed to divert that water from the drain to a municipal treatment plant or natural surface waters. The intake system of the present invention is designed to remove floating and non-floating particulates from the drain water before it reaches the final outlet destination.

In one aspect of the invention, a system is provided for separating floating and non-floating particulate from fluids. The system includes a tank having a bottom and interior sidewalls to define a storage chamber, an inlet at a first location on the interior sidewalls for receiving the drain water or stormwater from an upstream conduit, and an outlet at a second location on the interior sidewalls for transferring the drain water or stormwater to a downstream conduit; a baffle having a bottom, a first side baffle wall, a second side baffle wall and a port through from the first side baffle wall to the second side baffle wall, the baffle connected to the interior sidewalls of the tank, the bottom of the baffle spaced above the bottom of the tank to establish a storage chamber outlet for fluid within the storage chamber to pass along the second side baffle wall to the outlet; a bypass including an inlet flow control zone on the second side baffle wall between the inlet and the port of the baffle and an outlet flow control zone on the second side baffle wall between the storage chamber outlet and the outlet; and a weir positioned between the inlet flow control zone and the outlet flow control zone, the weir configured to divert fluid from the inlet to the baffle port under relatively low fluid flows and to divert one portion of the fluid from the inlet to the baffle port and to allow the remaining portion of the fluid from the inlet to the outlet under relatively high fluid flows. In one embodiment, the bypass includes a flow control plate attached between the second side baffle wall and the interior sidewalls of the tank. The inlet flow control zone is the space defined by the region between the inlet, the second side baffle wall, the interior sidewalls of the tank, the flow control plate and the weir. The outlet flow control zone is the space defined by the region between the outlet, the second side baffle wall, the interior walls of the tank, the flow control plate and the weir. In one arrangement, the flow control plate in the outlet flow control zone space includes one or more ports. In an arrangement of the system, the flow control plate is in a declined orientation from the inlet of the tank to the outlet of the tank. In arrangement of the system, the weir is a curved plate. In another arrangement, the weir is a flat plate angled from the inlet of the tank toward the baffle port. Optionally, the interior sidewalls of the tank are corrugated to aid in control of fluid movement in the storage chamber.

In another aspect of the invention, a system is provided for separating floating and non-floating particulate from a fluid and includes a tank having a tank bottom and a storage chamber bottom spaced above the tank bottom, and interior sidewalls, the interior sidewalls and the storage chamber bottom defining a storage chamber, an inlet at a first location on the interior sidewalls for receiving the fluid from an upstream conduit, and an outlet at a second location that may be separate from or substantially near or at the first location associated with the inlet on the interior sidewalls for transferring the fluid to a downstream conduit; a baffle having a bottom attached to the storage chamber bottom, a first side baffle wall, a second side baffle wall and a port through from the first side baffle wall to the second side baffle wall, the baffle connected to the interior sidewalls of the tank; a standpipe substantially centered within the storage chamber and establishing a passageway between the storage chamber and the outlet chamber, the outlet chamber for receiving water from the storage chamber and in communication with a region between the second side baffle wall and a portion of the interior sidewalls of the tank; a bypass including an inlet flow control zone on the second side baffle wall between the inlet and the port of the baffle and an outlet flow control zone on the second side baffle wall between the outlet chamber and the outlet; and a weir positioned between the inlet flow control zone and the outlet flow control zone, the weir configured to divert fluid from the inlet to the baffle port under relatively low fluid flows and to divert one portion of the fluid from the inlet to the baffle port and to allow the remaining portion of the fluid from the inlet to the outlet under relatively high fluid flows.

The details of one or more examples related to the invention are set forth in the accompanying drawings and the description below. Other features, objects, and advantages of the invention will be apparent from the description and drawings, and from the appended claims.

BRIEF DESCRIPTION OF THE DRAWINGS

FIG. 1A is a perspective view of the tank of the present invention showing the pipe stubs and the lid with access port cover. FIG. 1B is a cross-sectional elevation view of the tank of the present invention showing the inlet, the outlet and the associated pipe stubs.

FIG. 2A is a cross-sectional perspective view of the tank of the present invention showing the storage chamber, the tank inlet pipe stub and the baffle. FIG. 2B is a cross-sectional perspective view of an alternative design of the present invention showing the storage chamber, the tank inlet, the baffle, the optional bypass area lid, and riser with manhole cover. FIG. 2C is a cross-sectional perspective view of an alternative design of the storage chamber of the tank system of the present invention.

FIG. 4 is a perspective view of a first embodiment of the baffle and bypass of the present invention, showing the exterior side of the baffle, the weir, the inlet flow control zone, and the outlet flow control zone.

FIG. 5A is an end view of a section of the tank of the present invention looking into the inlet. FIG. 5B is a cross-sectional elevation view of a section of the tank of the present invention, showing the baffle, baffle port and pipe stubs.

FIG. 6A is a perspective view of a second embodiment of the bypass showing a curved weir and declining bypass plate. FIG. 6B is a plan view of the second embodiment of the bypass of FIG. 6A. FIG. 6C is an elevation view of the second embodiment of the bypass showing the declining bypass plate.

FIG. 7 is a partial cut-away perspective view of a second embodiment of the tank of the present invention, showing a center outlet from the storage chamber and an outlet chamber under the storage chamber.

FIG. 8A is a cross-sectional elevation view of an embodiment of the interior walls of the tank having helical-shaped corrugations for fluid shaping in the storage chamber. FIG. 8B is a partial cut-away perspective view of the helical-shaped corrugations of the interior walls of the storage chamber.

FIG. 9A is a first perspective view of a first alternative embodiment of the bypass of the present invention, showing the outlet flow control zone in context from the outlet side. FIG. 9B is a second perspective view of the first alternative embodiment of the bypass of the present invention, showing the outlet flow control zone in context from the inlet side. FIG. 9C is a cross sectional elevation view of the first alternative embodiment of the bypass shown in FIGS. 9A and 9B.

FIG. 10C is a cross sectional elevation view of the second alternative embodiment of the bypass shown in FIGS. 10A and 10B.

DETAILED DESCRIPTION OF THE PREFERRED EMBODIMENTS

Figure 3A:
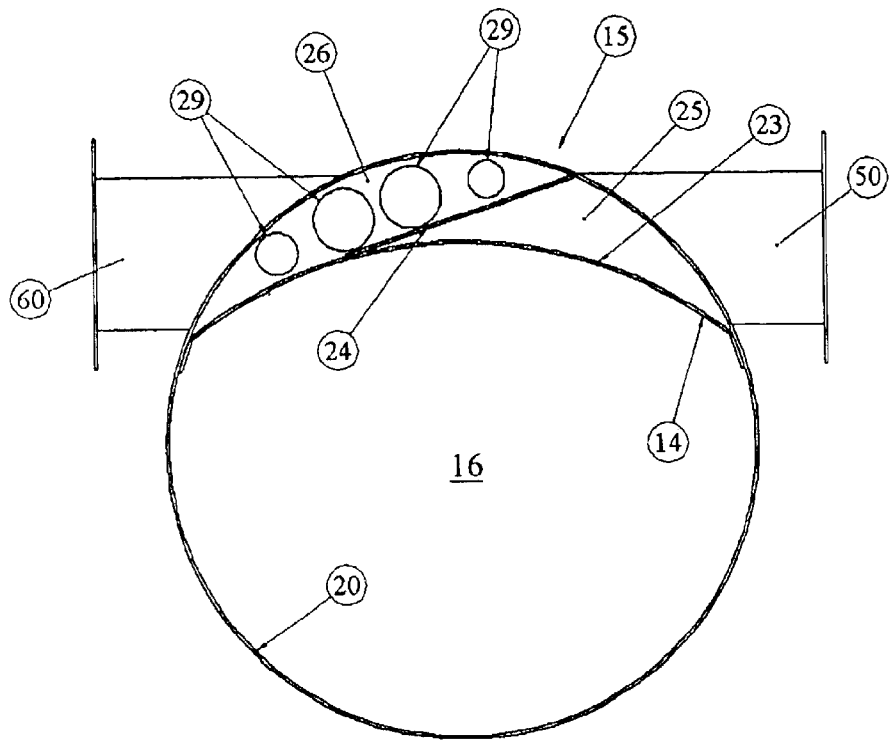
FIG. 3A is a plan view of the tank of the present invention, showing the inlet and outlet, the baffle, the outlet ports, and an angled weir.

A separation system 10 of the present invention is illustrated in the accompanying drawings. As illustrated in FIGS. 1A and 1B, the system 10 includes a tank 11 having an inlet pipe stub 50 and an outlet pipe stub 60. The tank 11 is preferably made of concrete but may alternatively be fabricated in whole or in parts of metal, plastic, such as fiberglass, or other suitable materials. It may be fabricated of an existing manhole or manhole design and modified in the manner to be described herein. The inlet pipe stub 50 shown in FIG. 1A is represented as a short pipe terminating in a flange that may be used to connect the tank 11 to an upstream fluid transfer system. Similarly, the outlet pipe stub 60 shown in FIG. 1A is represented as a short pipe terminating in a flange that may be used to connect the tank to a downstream fluid transfer system. For example, the upstream fluid transfer system may include a drainage system from a roadway or a parking lot and the downstream fluid transfer system may include a municipal water treatment plant or natural or artificial surface waters.

In an embodiment of the tank 11 shown in FIG. 2B, the inlet pipe stub 50 and the outlet pipe stub 60 may be fabricated as an integral part of the body of the tank 11 rather than being attached to the tank. In the configuration of the pipe stubs shown in FIG. 2B, the pipe stubs 50 and 60 are configured to receive in sockets thereof conduits from upstream and downstream fluid transfer systems, respectively. In either arrangement of the pipe stubs 50 and 60, it is of interest to configure them to receive upstream and downstream conduits positionable by their connections to the pipe stubs 50 and 60 to ensure the fluid enters the tank 11 tangentially.

Figure 3B:
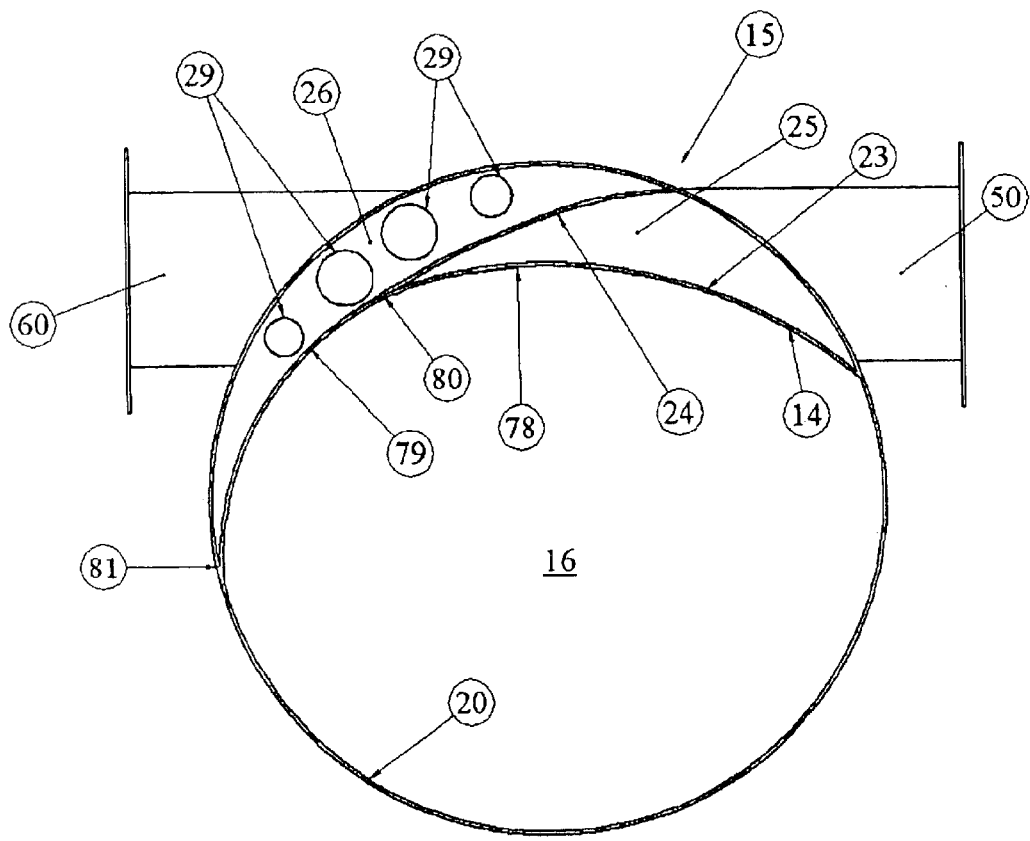
FIG. 3B is a plan view of the tank of the present invention, showing the baffle with complex curvature, the outlet ports, and a curved weir.

The tank 11 includes an inlet 12 associated with the inlet pipe stub 50, an outlet 13 associated with the outlet pipe stub 60, a baffle 14, and a bypass 15 (shown in FIGS. 3A, 3B, and 4). The tank 11 establishes a storage chamber 16 defined by a tank bottom 17 and sidewalls 18 in a cylindrical form but may alternatively be in a polygonal form. The shape and dimensions of the storage chamber 16 are further defined by a lid 19 removably attachable to the sidewalls 18 at a top thereof, and to the baffle 14, also at a top thereof. The lid 19 shown in FIGS. 1A and 1B substantially completely covers the tank 11 and may include an access port with access port cover 72 for accessing the interior of the storage chamber 16 for maintenance purposes without removing the entire lid 19. The tank top of the sidewalls may include a flange for removable attachment of the lid 19 to the tank 11. It is also possible that the height of the sidewalls 18 and the baffle 14 may be set to ensure that they are above the highest possible water surface, thereby eliminating the need for a lid while allowing the interior of the tank 11 to be open for inspection.

The baffle 14 is located within the tank 11 as a sectional wall removably attachable to an interior side 20 of the sidewalls 18. The baffle 14 extends downward from a top area 21 of the tank 11 to a point above the tank bottom 17. An inner sidewall 22 of the baffle 14 is configured to prevent floating particulate from exiting the storage chamber 16 of the tank 11. If a lid such as lid 19 is employed, positioning the baffle 14 to be in sealing contact with the lid 19 ensures that non-floating particulate entering the storage chamber 16 cannot move over the top of the baffle 14 and into the bypass 15. Alternatively, a tank 11 with sidewalls 18 and baffle 14 above the highest possible water surface ensures that floating particulates cannot exceed the height of the baffle 14. An outer sidewall 23 of the baffle 14 is spaced from the interior side 20 of the tank 11 by the bypass 15.

In an alternative design of the tank 11 of the present invention shown in FIG. 2B, a partial lid 73 detachably connectable to the baffle 14 and a portion of the sidewalls 18 covers only the area between the outer sidewall 23 of the baffle 14 and the interior side 20 of the tank sidewalls 18 to ensure that floating particulates do not enter the bypass 15 from the storage chamber 16. The remainder of the inside of the tank 11 that forms the storage chamber 16 remains open to a conventional neck-down riser 74 terminating in a conventional manhole cover 75 at or near the surface. The manhole cover 75 and the riser 74 provide an alternative means for accessing the storage chamber 16. In addition, a net or screen may be deployed within the storage chamber 16 to aid in the separation of neutrally buoyant particulates from the fluid in the storage chamber 16. That is, particulates that neither float and are blocked by the baffle 14, nor non-floating particulates that fall to the bottom 17 and are retained in the storage chamber 16.

In an alternative design of the tank 11 shown in FIG. 2C, the height dimension of the storage chamber 16 is substantially reduced and the diameter thereof is larger with respect to the diameter of the tank in the area of the baffle 14. However, the baffle and bypass configurations remain substantially as indicated with respect to the tank 11 design of FIGS. 1–2B. In the tank 11 design of FIG. 2C, the substantially reconfigured design of the storage chamber 16 portion enables introduction of the system 10 into locations having smaller height tolerances. The larger diameter of the tank 11 at the storage chamber 16 area ensures adequate dwell time of the fluid in the storage chamber 16 for the purpose of non-floating particulate settling and for floating particulates to come to the surface of the fluid.

The bypass 15 shown in FIGS. 3A, 3B, and 4 regulates the flow of fluid into and out of the storage chamber 16. The bypass includes a bypass plate 77. The bypass plate 77 may be substantially horizontally oriented with respect to the centerline of the tank 11, it may be sloped or curved, or it may be stepped in an alternative embodiment to be described herein with respect to FIGS. 9A–9C. A weir 24 is disposed on the bypass 15, dividing the bypass passageway into an inlet flow control zone 25 and an outlet flow control zone 26. The baffle 14 includes a baffle port 27 spaced from the tank inlet 12 by the inlet flow control zone 25. As can be seen, the baffle port 27 is through and through from the outer sidewall 23 to the inner sidewall 22. If a net is employed, it is preferably positioned below the baffle port 27 to capture neutrally buoyant particulates as they enter the storage chamber 16. The baffle port 27 and the inlet flow control zone 25 are configured to direct flow entering the tank 11 at the tank inlet 12 in a manner that generates a fluid flow tangential to the inner sidewall 22 of the baffle and the interior side 20 of the sidewalls 18 of the tank 11.

The outlet flow control zone 26 of the bypass 15 includes one or more ports 29 through which the fluid exits the storage chamber 16 by way of the intermediate region below the bypass plate 77 and between the outer sidewall 23 of the baffle 14 and the interior side 20 of the tank 11. Although FIGS. 3A, 3B, and 4 show four of the ports 29, it is to be understood that more or fewer ports may be employed. Further, while the ports 29 are shown as being substantially round, it is to be understood that they may be other shapes including, but not limited to polygons and ovals. Yet further, the dimensions of the ports 29 (or simply one port if that is the design choice) may be selected as a function of the desired fluid output rate from the storage chamber 16 and the degree to which turbulence must be minimized.

The baffle 14 shown in FIG. 3A is formed with a single curvature aspect to direct the fluid flow within the tank 11, and an angled weir 24 to direct the fluid flow from the inlet flow control zone 25 through the baffle port 27. Alternatively, as shown in FIG. 3B, the baffle 14 may be formed of a complex curvature having a first curvature aspect 78 including the baffle port 27, and a second curvature aspect 79. In addition, the weir 24 may also be curved. The curvature of the weir 24 smoothes the fluid flow transition from the inlet flow control zone 25 through the baffle port 27 and into the storage chamber 16. The curved weir 24 of FIG. 3B blends with the curvature of the second curvature aspect 79 of the baffle 14 to enhance the smoothing of that transition. The curved weir 24 and the second curvature aspect 79 may be formed of a unitary structure connectable to the first curvature aspect 78. Alternatively, the baffle 14 with the two curvature aspects may be formed of a unitary structure connectable to the curved weir 24. Further, each of the weir 24, the first curvature aspect 78 and the second curvature aspect 79 may be separate structures all connectable together.

With continuing reference to FIG. 3B, the first curvature aspect 78 is preferably configured to aid in the fluid flow transitioning as the fluid moves within the storage chamber 16 and may have a less severe curvature than that of second curvature aspect 79. The second curvature aspect 79 deviates from the configuration of the first curvature aspect 78 at a weir-baffle interface 80 and terminates at a baffle-chamber interface 81 in a transitional manner so that fluid flow remains as smoothed as possible when the baffle-chamber interface 81 is reached. The arrangement of the curved internally positioned baffle 14, the baffle port 27, and the inlet flow control zone 25 provides a cost effective means for handling substantial fluid flows while also causing removal of floating and non-floating particulate from the fluid. It is configured to balance the twin goals of fluid flow smoothing (i.e., low turbulence) and maximizing treatment volume within the dimensions of the tank 11. That is, an optimal curvature of the baffle 14 and of the weir 24 produces the least amount of turbulence within the tank 11 while minimizing the reduction of the volume of the storage chamber 16 and fluid dwell time therein. In a comparison of the designs of the baffle 14 and weir 24 shown in FIGS. 3A and 3B, it is to be noted that the arrangement of FIG. 3A provides more fluid turbulence in a larger treatment volume while the arrangement of FIG. 3B provides less fluid turbulence within a smaller treatment volume. Both have their advantages.

The overall reduction in fluid turbulence produced by the design of the system 10 of the present invention reduces the level of particulate entrainment, leading to better particulate removal within the tank 11. In particular, the arrangement of the baffle port 27 and the baffle 14 shape aids in flow smoothing, a useful outcome when maximum particulate removal is desired. The failure to provide the smoothest fluid flow possible increases the likelihood of particulate entrainment as well as particulate scouring out of the storage chamber 16.

The shape and dimensions of the baffle port 27 may be varied or selected as a function of the particular flow conditions to be expected. However, as shown in FIGS. 5A and 5B, the baffle port 27 is preferably shaped to be spaced above the bypass plate 77 near the inlet 12 and to gradually approach the bypass plate 77 away from the inlet 12 toward the baffle-weir interface 80. As a result, under low fluid flow conditions, the fluid is restricted from immediately entering the storage chamber 16 through the baffle port 27 as it passes between the outer sidewall 23 of the baffle 14 and the weir 24 until reaching the inner sidewall 22 of the baffle 14 approaching the weir-baffle interface 80. In that way, the fluid is forced to enter the storage chamber 16 tangentially at a higher velocity. If the baffle port 27 were of constant dimension through the inlet flow control zone 25, at low flows, the fluid would immediately spill into the storage chamber 16 non-tangentially at a lower velocity, which disrupts the smooth flow pattern associated with tangential entry. It is advantageous to increase the velocity of low flows to promote the development of rotational flow in the storage chamber 16. As flow rates increase, the fluid enters the storage chamber 16 through the baffle port 27 relatively closer to the inlet 12. The relatively higher fluid velocity associated with relatively higher flow rates aids in maintaining a substantially tangential flow pattern as the fluid enters the storage chamber 16. The relatively high flow rates do not need to be accelerated. The transitional design of the baffle port 27 aids in slowing the flow rate in that situation and therefore aids in reducing turbulence. A baffle port 27 of constant dimensions would be less effective in regulating fluid flow under all flow conditions.

The bypass 15 comprising the inlet flow control zone 25, the outlet flow control zone 26, and the weir 24 may be formed with a plate connected perpendicularly or substantially perpendicularly to the bypass plate 77 between the outer sidewall 23 of the baffle 14 and the interior side 20 of the tank 11. The dimensions of the two flow control zones may be configured as a function of the fluid flow rates required to be treated and defined by the size of the weir 24 and the arrangement of the baffle 14, the bypass plate 77, and any lid, with respect to the interior dimensions of the tank 11.

The inlet flow control zone 25 is further configured to change the shape of the fluid flowing into the inlet 12 so as to reduce its turbulence when entering the tank 11 and thereby preferably reduce particulate entrainment in the fluid. The tangential flow of the fluid into the storage chamber 16 causes it to pass along the inner sidewall 22 of the baffle 14 and the interior side 20 of the tank 11 to produce a swirling effect. In the embodiment of the tank 11 shown in FIG. 5B, the bottom of the baffle 14 may be shaped downwardly sloping with respect to the direction of fluid swirl within the storage chamber 16. That shape of the bottom of the baffle 14 is preferably configured to substantially match the shape of the flow of particulates trajectory as they pitch about within the storage chamber 16 so that such particulates may not otherwise be drawn into the area under the baffle 14 before having a chance to settle on the tank bottom 17.

Referring to FIG. 4, the weir 24 provides a means for regulating the direction of fluid flow through the bypass 15 as a function of incoming fluid flow rate. Weir 24 is designed with a wall height such that its top exceeds the height of the baffle port 27. As a result, fluid entering the inlet flow control zone 25 crests the weir 24 at a higher elevation than the top of baffle port 27. The baffle port 27 is therefore preferably submerged when the fluid in the inlet flow control zone 25 reaches the crest of the weir 24. The purpose is to trap floating particulate in the storage chamber 16 during relatively high fluid flow rates while enabling fluid bypassing at such rates, and to allow the weir 24 to trap floating particulates as the fluid surface elevation falls below the crest of the weir 24. During relatively low flow conditions and at the start of relatively high flow conditions, any floating particulate in the inlet flow control zone 25 is washed into the storage chamber 16 such that none is lost over the weir 24 if/when the fluid reaches the crest of the weir 24. Otherwise, in general, the weir 24 is sized to divert all fluid entering at relatively low flow rates from the inlet flow control zone 25 into the storage chamber 16 in a manner consistent with the desire to create a flow tangential to the interior side 20 of the tank 11, and to maximize removal efficiency while minimizing scouring. The weir 24 is further sized for relatively high flow rates to divert a portion of the entering fluid into the storage chamber 16 and to allow the remainder of the entering fluid to flow directly from the inlet flow control zone 25 directly to the outlet flow control zone 26 for exiting the outlet 13 of the tank. The specific dimensions of the weir may be varied as a function of the desired amount of fluid treatment for particular inlet flow conditions. As earlier indicated with respect to FIGS. 3A and 3B, the weir 24 may be an angled rectangular plate or some other form of polygon or another shape, or it may be curved with respect to the direction of flow of the incoming fluid.

In operation, fluid entering the tank 11 via the inlet 12 under low flow conditions first passes along the inlet flow control zone 25 of the bypass 15 and is diverted by the weir 24 through the baffle port 27 into the storage chamber 16. As the fluid level in the storage chamber 16 rises, it comes up along the outer sidewall 23 of the baffle 14 until it reaches the underside of the bypass 15. Upon reaching the underside of the bypass 15, it passes through the port(s) 29 of the outlet flow control zone 26. It is to be understood that after an initial filling of the storage chamber 16 as indicated above, the fluid remains substantially at a level of the bypass plate 77. Thereafter, the fluid level in the storage chamber 16 only rises as fluid enters the tank 11. The outlet flow control zone 26 and its ports 29 limit fluid flow through the storage chamber 16 and to increase head loss such that the upstream fluid surface elevation in the inlet flow control zone 25 rises and increases the head and volume of fluid in the storage chamber. This serves to decrease the average velocity of the fluid in the tank 11, a feature that improves flow smoothing previously described. The arrangement of the outlet flow control zone 26 and its ports 29 also causes the inlet 12 to become submerged at relatively lower flow rates, also a feature of value in smoothing flow within the storage chamber 16. That is, at a given flow rate, the fluid within the storage chamber 16 appears much "calmer" when the inlet 12 is submerged.

As the fluid exits zone 26 by way of outlet 13, non-floating particulates remain in the storage chamber 16 and are generally directed toward the center of the storage chamber 16 due to the tangential flow of the fluid and the reduction in flow turbulence caused by the configuration of the inlet flow control zone 25, the weir 24, and the baffle 14. Floating particulates also remain in the storage chamber 16 and are blocked from reaching the outlet flow control zone 26 of the bypass 15 by the inner sidewall 22 of the baffle 14 and by weir 24. Under relatively higher flow rates, a portion of the fluid entering the tank 11 continues to be diverted by the weir 24 into the storage chamber 16. The remainder stays in the bypass 15 and flows over the weir 24, traveling directly from the inlet flow control zone 25 to the outlet flow control zone 26. It then flows out of the outlet 13 without having spent any dwell time in the storage chamber 16 for the purpose of removing particulates. That arrangement reduces scouring/wash out effects during said relatively higher flow rates. Also, since most non-floating particulate typically resides at the bottom of a conduit such as a conduit connected to pipe stub 50 due to the effects of gravity and settling, and generally in the lowest region of a fluid flow, the non-floating particulate stratification (most particulates at the bottom of the flow and least particulates at the top of the flow), diverting all of the fluid at the relatively lower flow rate directs most of the non-floating particulates into the storage chamber 16 for removal. On the other hand, the top portion of a fluid flow at relatively higher flow rates contains the least amount of non-floating particulates. The arrangement of the weir 24 allows that top portion (and least particulate containing) part of the fluid to flow directly to the outlet flow control zone 26 under relatively higher flow rates, thereby maximizing particulate separation in an effective separation tank design while also ensuring all fluid flow conditions can be handled.

As illustrated in FIGS. 6A–6C, a second embodiment of the bypass 15', the flow plate designated as bypass plate 77' that defines in part the shape and dimensions of the bypass 15' is slightly sloped downwardly from the inlet 12 to the outlet 13. Further, weir 24' is curved, in a manner described with reference to the weir 24 of FIG. 3B, and positioned further away from the inlet 12 than is the weir 24 of the first embodiment of the invention. The baffle port 27' is also positioned further from the inlet 12 than is the baffle port 27 of the first embodiment of the bypass 15, thereby orienting the inlet 12 with respect to the fluid flow such that it is submerged relatively sooner than if the bypass plate 77' were substantially horizontally oriented. Submersion of the inlet 12 sooner rather than later under the varied fluid flow conditions to be expected likely aids in setting the shape of the fluid flow within the storage chamber 16. A port 29' of the outlet flow control zone 26' is of oblong shape and only one employed. However, it is to be understood that alternative port configurations may be substituted, including the plurality of ports of the first embodiment of the outlet flow control zone.

As illustrated in FIG. 7, a second embodiment of the system 10' of the present invention includes a tank 30 with a baffle 31, inlet flow control zone (not shown), and outlet flow control zone 32, substantially as designed with respect to the tank 11 or 11' arrangement of FIGS. 1–7. However, the tank 30 includes a standpipe 33 substantially centered in a storage chamber 34, the shape and volume of which is defined by the dimensions of interior walls 35, the baffle 31, and storage chamber bottom 36. It is within the storage chamber 34 that floating and non-floating particulates entering through baffle port 37 are retained. The standpipe 33 includes a standpipe port 38 through which fluid reaching that level passes into output chamber 39 established between the storage chamber bottom 36 and tank bottom 40. The standpipe port 38 is preferably a bellmouth port as shown, as a means to reduce fluid inlet velocity at that entry point. An optional crucifix 41 or an optional standpipe cover plate 42 may be included at the entry area of the standpipe 33 to reduce vortex effects on the fluid exiting the storage chamber 34, and to reduce particulate entrainment.

In use, the system 10' of FIG. 7 operates in much the same manner as the system 10 shown in FIGS. 1–5, including the bypass arrangement of FIGS. 6A–6C with respect to the intake of fluid, the flow control zones of the bypass including the weir, and the output of fluid having particulates removed. However, it varies from system 10 in the manner of transfer of fluid out of the storage chamber 34 as compared to fluid transfer out of storage chamber 16. In particular, when the fluid level in the storage chamber 34 exceeds the height of the standpipe 33, it flows down into the output chamber 39 before passing upward along the outer sidewall of the baffle 31 to the outlet flow control zone (not shown) for transfer out of the tank 30. Preferably, the standpipe 33 is positioned such that the standpipe port 38 is below the fluid surface elevation under all flow conditions, with floating particulates remaining above the standpipe port 38 and non-floating particulates remaining below the standpipe port 38 substantially under all flow conditions so as to avoid scouring of floating and non-floating particulates. More generally, it is to be understood that placing the standpipe 33 substantially centered in the tank 30 such that the fluid exits down through the center of the storage chamber 34 minimizes disruption of the flow pattern within the storage chamber 34 and therefore maximizes particulate separation. Prior devices having conduits extending through the flow pattern disrupt that pattern and are therefore generally less effective at particulate removal.

As illustrated in FIGS. 8A and 8B, the interior side 20 of the sidewalls 18 of the tank 11 may optionally be corrugated. The corrugations 90 are in a helical orientation with the helix spiraling downwardly from the tank inlet 12 to the tank bottom 17. The specific angle of the corrugations 90 may be selected as a function of the desired fluid flow rate down into the storage chamber 16; however, that angle should match the downward flow trend of the fluid under average flow conditions. The corrugations 90 are designed to aid in the smoothing of the fluid flow within the tank 11. In the alternative, the corrugations 90 may be oriented with the helix angle opposing the fluid flow pattern (that is, spiraling downwardly from the tank outlet 13 instead) to produce more turbulence of the flow pattern along the interior side 20 of the sidewalls 18 if that is determined to be of interest. It is also to be noted that additional or alternative flow-disrupting projections, such as ribs, may form part of the interior of the tank 11.

In a first alternative embodiment of the bypass of tank 100 shown in FIGS. 9A–9C, the arrangement of the storage chamber 16, the pipe stubs 50 and 60 and their associated inlet and outlet (not shown), the baffle 14 remains substantially as previously described. However, the tank 100 includes a first alternative inlet flow control zone 101 and a first alternative outlet flow control zone 102 of a first alternative bypass 103. The inlet flow control zone 101 includes weir 104 with weir cover plate 105. Weir 104 directs fluid entering the inlet of the tank 100 to baffle port 27 for treatment in the storage chamber 16. As fluid within the storage chamber 16 rises behind the baffle 14, it exits vertically oriented outlet port 106 of secondary flow control wall 107 and passes through the outlet flow control zone 102 defined by outlet bypass plate 108 attached to secondary flow control wall 107, the backside of baffle 14, the interior wall of the tank 100, and the secondary flow control wall 107. This arrangement of the bypass 103 moves the outlet from the storage chamber 16 away from the tank outlet and closer to the tank inlet. The arrangement aids in the transition of fluid flow out of the tank 100.

Figure 10A:
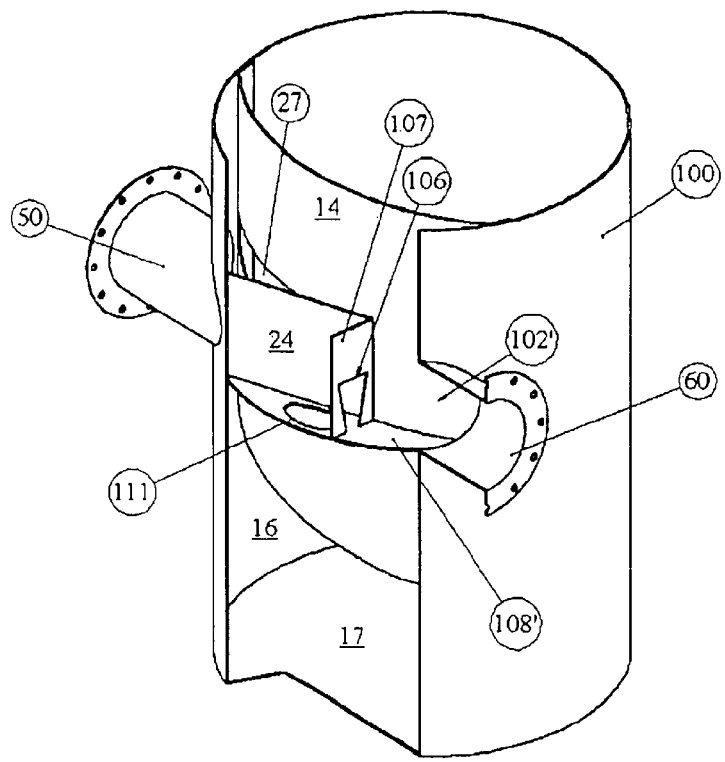
FIG. 10A is a first perspective view of a second alternative embodiment of the bypass of the present invention, showing the outlet flow control zone in context from the outlet side.
Figure 10B:
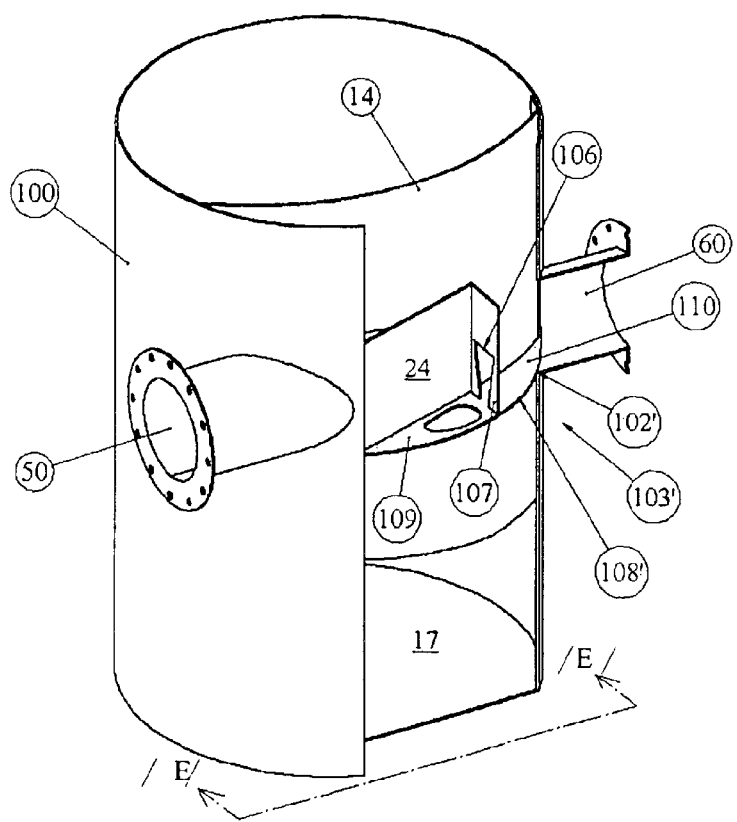
FIG. 10B is a second perspective view of the second alternative embodiment of the bypass of the present invention, showing the outlet flow control zone in context from the inlet side.

In a second alternative embodiment of the bypass of the tank 100 shown in FIGS. 10 A–C, the arrangement of the storage chamber 16, the pipe stubs 50 and 60 and their associated inlet and outlet, the inlet flow control zone (not shown), the weir 24, and the baffle 14 remains substantially as previously described. However, the tank 100 includes a second alternative bypass 103' having a second alternative outlet flow control zone 102' with secondary flow control wall 107 and bypass plate 108'. The bypass plate 108' includes an upstream section 109 divided from a downstream section 110 by secondary flow control wall 107. The secondary flow control wall 107 includes the vertically oriented outlet port 106 described in regard to FIGS. 9A–9C. However, the upstream section 109 of bypass plate 108' contains a secondary flow control aperture 111 upstream of the secondary flow control wall 107. The aperture 111 may be sized to regulate flow of fluid out of the treatment chamber and thus through the outlet port 106 as required.

The benefit of the additional flow control associated with this second alternative embodiment of the bypass is to moderate the flow rate through the storage chamber 16 when flow over the weir 24 occurs. Low flows passing only through the storage chamber 16 are allowed to freely discharge through the aperture 111 and the outlet port 106. However, as flow crests the weir 24 and enters the upstream section 109 of the bypass 103', the additional flow is restricted by the outlet port 106 and begins to submerge the upstream section 109. This pooling of fluid in upstream section 109 creates an additional resistance to flow through the secondary flow control aperture 111. This will result in a relatively consistent flow rate through the storage chamber 16 even as flow through the entire system increases.

While the present invention has been described with particular reference to certain embodiments of the separation system, it is to be understood that it includes all reasonable equivalents thereof as defined by the following appended claims.

What is claimed is:

1. A separation system for separating floating and non-floating particulate from a fluid, the system comprising:
   a) a tank having a bottom and interior sidewalls to define a storage chamber, an inlet at a first location on the interior sidewalls for receiving the fluid, and an outlet at a second location on the interior sidewalls for transferring the fluid out of the tank;
   b) a baffle having a bottom, a first side baffle wall, a second side baffle wall and a port through from the first side baffle wall to the second side baffle wall, the baffle connected to the interior sidewalls of the tank, the bottom of the baffle spaced above the bottom of the tank to establish a storage chamber outlet for fluid within the storage chamber to pass along the second side baffle wall to the outlet;
   c) a bypass including an inlet flow control means on the second side baffle wall between the inlet and the port of the baffle and an outlet flow control means on the second side baffle wall between the storage chamber outlet and the outlet; and d) a weir positioned between the inlet flow control means and the outlet flow control means, the weir configured to divert fluid from the inlet to the baffle port under relatively low fluid flows and to divert one portion of the fluid from the inlet to the baffle port and to allow the remaining portion of the fluid to flow from the inlet to the outlet under relatively high fluid flows.

2. The system as claimed in claim 1 wherein the bypass includes a bypass plate attached between the second side baffle wall and the interior sidewalls of the tank.

3. The system as claimed in claim 2 wherein the inlet flow control means is the space defined by the region between the inlet, the second side baffle wall, the interior sidewalls of the tank, the bypass plate and the weir.

4. The system as claimed in claim 2 wherein the outlet flow control means is the space defined by the region between the outlet, the second side baffle wall, the interior walls of the tank, the bypass plate and the weir.

5. The system as claimed in claim 4 wherein the bypass plate in the outlet flow control means space includes one or more ports.

6. The system as claimed in claim 2 wherein the bypass plate is in a declined orientation from the inlet of the tank to the outlet of the tank.

7. The system as claimed in claim 1 wherein the weir is a curved plate.

8. The system as claimed in claim 1 wherein the weir is a flat plate angled from the inlet of the tank toward the baffle port.

9. The system as claimed in claim 1 wherein the interior sidewalls of the tank are corrugated.

10. The system as claimed in claim 1 wherein the baffle is curved.

11. The system as claimed in claim 10 wherein the baffle has a complex curvature including a first curvature aspect and a second curvature aspect.

12. The system as claimed in claim 11 wherein the weir has a curved configuration substantially matching a curvature of the second curvature aspect.

13. The system as claimed in claim 12 wherein the weir and the second curvature aspect are formed together as a unitary structure.

14. The system as claimed in claim 1 wherein the bottom of the baffle is shaped to substantially follow the shape of the particulates trajectory within the storage chamber.

15. The system as claimed in claim 1 wherein the opening defined by the baffle port is shaped such that it is spaced away from the bypass plate near the inlet and approaches the bypass plate toward an interface of the baffle and the weir.

16. The system as claimed in claim 1 wherein the weir has a wall height such that its top exceeds the height of the top of the baffle port.

17. The system as claimed in claim 1 wherein the outlet flow control means includes a bypass plate and a secondary flow control wall with an outlet port therein, the outlet port configured to transfer fluid from the storage chamber to the tank outlet.

18. The system as claimed in claim 17 wherein the secondary flow control wall is vertically oriented with respect to the tank bottom.

19. The system as claimed in claim 17 wherein the inlet flow control means includes a weir cover plate attached to the weir and to the secondary flow control wall.

20. The system as claimed in claim 17 wherein the bypass plate includes an upstream section and a downstream section divided from the upstream section by the secondary flow control wall, the upstream section including an aperture.

21. A separation system for separating floating and non-floating particulate from a fluid, the system comprising:

a) a tank having a tank bottom and a storage chamber bottom spaced above the tank bottom and interior sidewalls, the interior side walls and the storage chamber bottom defining a storage chamber, an inlet at a first location on the interior sidewalls for receiving the fluid from an upstream conduit, and an outlet at a second location on the interior sidewalls for transferring the fluid to a downstream conduit;

b) a baffle having a bottom attached to the storage chamber bottom, a first side baffle wall, a second side baffle wall and a port through from the first side baffle wall to the second side baffle wall, the baffle connected to the interior sidewalls of the tank;

c) a standpipe substantially centered within the storage chamber and establishing a passageway between the storage chamber and the outlet chamber, the outlet chamber for receiving fluid from the storage chamber and in communication with a region between the second side baffle wall and a portion of the interior sidewalls of the tank;

d) a bypass including an inlet flow control means on the second side baffle wall between the inlet and the port of the baffle and an outlet flow control means on the second side baffle wall between the outlet chamber and the outlet; and e) a weir positioned between the inlet flow control means and the outlet flow control means, the weir configured to divert fluid from the inlet to the baffle port under relatively low fluid flows and to divert one portion of the fluid from the inlet to the baffle port and to allow the remaining portion of the fluid from the inlet to the outlet under relatively high fluid flows.

22. The system as claimed in claim 21 wherein the bypass includes a bypass plate attached between the second side baffle wall and the interior sidewalls of the tank.

23. The system as claimed in claim 22 wherein the inlet flow control means is the space defined by the region between the inlet, the second side baffle wall, the interior sidewalls of the tank, the bypass plate and the weir.

24. The system as claimed in claim 22 wherein the outlet flow control means is the space defined by the region between the outlet, the second side baffle wall, the interior walls of the tank, the bypass plate and the weir.

25. The system as claimed in claim 24 wherein the bypass plate in the outlet flow control means space includes one or more ports.

26. The system as claimed in claim 22 wherein the bypass plate is in a declined orientation from the inlet of the tank to the outlet of the tank.

27. The system as claimed in claim 21 wherein the weir is a curved plate.

28. The system as claimed in claim 21 wherein the weir is a flat plate angled from the inlet of the tank toward the baffle port.

29. The system as claimed in claim 21 wherein the interior sidewalls of the tank are corrugated.

30. The system as claimed in claim 21 wherein the standpipe includes a bellmouth port and a crucifix therein.

31. The system as claimed in claim 21 wherein the standpipe includes a bellmouth port and a standpipe cover spaced above and attached to the bellmouth port.

32. A separation system for separating floating and non-floating particulate from a liquid, the system comprising:
- a tank structure having a bottom, an inlet for receiving liuid, and an outlet for transferring liquid out of the tank structure, the tank structure including a storage chamber for retaining floating and non-floating particulate;
- a bypass flow path within the tank structure, the inlet delivers liquid to the bypass flow path and the outlet receives liquid from the bypass flow path, the bypass flow path defined in part by a bypass floor spaced at a level above a level of the bottom of the tank structure and a baffle member extending upwardly from the bypass floor, the upwardly extending baffle member includes a baffle port therein for permitting liquid to exit the bypass flow path and enter the storage chamber, the bypass floor includes an opening to permit liquid to reenter the bypass flow path, wherein a baffle member extends downwardly from the bypass floor and in part defines a passage to the bypass floor opening, the upwardly extending baffle member is curved in a region of the baffle port;
- a weir positioned in the bypass flow path between the inlet and the outlet, the weir configured such that (i) under relatively low incoming liquid flows liquid is directed by the weir from the inlet through the baffle port and (ii) under relatively high incoming liquid flows one portion of liquid s directed by the wier from the inlet through the baffle port and a remaining portion of liquid flows along the bypass flow path from the inlet to the outlet without passing through the baffle port.

33. The system as claimed in claim 32 wherein the downwardly extending baffle member is curved.

34. The system as claimed in claim 32 wherein the upwardly extending baffle member and the downwardly extending baffle member are formed by a common wall member, the upwardly extending baffle member and the downwardly extending baffle member having common curvature.

35. The system as claimed in claim 32 wherein the baffle port is shaped such that it is spaced away from the bypass floor nearer the inlet and approaches the bypass floor further from the inlet.

36. The system as claimed in claim 32 wherein the baffle member is adjacent to the bypass floor.

37. A separation system for separating floating and non-floating particulate from a fluid, the system comprising:
- a) a tank having a bottom and interior sidewalls establishing a storage chamber, an inlet for receiving the fluid, and an outlet for transferring the fluid out of the tank;
- b) a baffle having a bottom and an opening, wherein the baffle is configured to direct fluid entering the tank to pass from behind the baffle through the opening into the storage chamber along the interior sidewalls thereof, the baffle positioned within the tank, the bottom of the baffle speed above the bottom of the tank;
- c) a weir positioned between the inlet and the outlet, the wier configured to divert fluid from the inlet to the baffle opening under relatively low fluid flows and to divert one portion of the fluid from the inlet to the baffle opening and to allow the remaining portion of the fluid to flow from the inlet to the outlet under relatively high fluid flows; and
- d) means between the inlet and the outlet behind the baffle to allow fluid to flow directly from the inlet to the outlet without passing through the baffle opening.

38. The system as claimed in claim 37 wherein the means between the inlet and the outlet is a bypass flow path, wherein the inlet delivers fluid to the bypass flow path and the outlet receives fluid from the bypass flow path.

39. The system as claimed in claim 38 wherein the bypass flow path includes a bypass floor spaced at a level above a level of the bottom of the tank, wherein the baffle is adjacent to the bypass floor and extends upwardly and downwardly from the bypass floor, wherein the bypass floor includes an opening to permit fluid to reenter the bypass flow path from behind the baffle.

\* \* \* \* \*

UNITED STATES PATENT AND TRADEMARK OFFICE
CERTIFICATE OF CORRECTION

PATENT NO.         : 6,991,114 B2
APPLICATION NO. : 10/664376
DATED              : January 31, 2006
INVENTOR(S)       : Vaikko P. Allen, II et al.

It is certified that error appears in the above-identified patent and that said Letters Patent is hereby corrected as shown below:

Col. 15

Line 4 – Change "liuid" to -- liquid --.

Line 27 – Change "s" to -- is --.

Change "wier" to -- weir --.

Col. 16

Line 16 – Change "speed" to -- spaced --.

Line 18 – Change "wier" to -- weir --.

Signed and Sealed this

Twenty-second Day of August, 2006

JON W. DUDAS
*Director of the United States Patent and Trademark Office*